(12) United States Patent
Riederer et al.

(10) Patent No.: US 11,999,304 B2
(45) Date of Patent: Jun. 4, 2024

(54) APPARATUS FOR FASTENING A VEHICLE COMPONENT IN AND/OR ON A VEHICLE

(71) Applicant: ADLER PELZER HOLDING GMBH, Hagen (DE)

(72) Inventors: Frank Riederer, Witten (DE); Thomas Karcz, Dortmund (DE); Volkmar Schulze, Schierling (DE); Wolfgang Riedisser, Renningen (DE); Tobias Baeuerle, Aspach (DE)

(73) Assignee: ADLER PELZER HOLDING GMBH (DE)

( * ) Notice: Subject to any disclaimer, the term of this patent is extended or adjusted under 35 U.S.C. 154(b) by 0 days.

(21) Appl. No.: 17/801,453

(22) PCT Filed: Jan. 15, 2021

(86) PCT No.: PCT/EP2021/050876
§ 371 (c)(1),
(2) Date: Aug. 22, 2022

(87) PCT Pub. No.: WO2021/164962
PCT Pub. Date: Aug. 26, 2021

(65) Prior Publication Data
US 2023/0082634 A1     Mar. 16, 2023

(30) Foreign Application Priority Data

Feb. 20, 2020   (DE) .................. 10 2020 104 489.5

(51) Int. Cl.
*B60R 13/02*     (2006.01)
*B60R 13/08*     (2006.01)
(Continued)

(52) U.S. Cl.
CPC ...... *B60R 13/0206* (2013.01); *B60R 13/0815* (2013.01); *F16B 5/0642* (2013.01);
(Continued)

(58) Field of Classification Search
CPC . B60R 13/0206; B60R 13/0815; B60R 13/08; F16B 5/0642; F16B 5/0657; F16B 5/0664; F16B 21/065; F16B 21/084
See application file for complete search history.

(56) References Cited

U.S. PATENT DOCUMENTS 7,614,836 B2    11/2009  Mohiuddin et al. .......... 411/510
2006/0125286 A1*  6/2006  Horimatsu ............ F16B 5/0642
                                                    296/187.03
(Continued)

FOREIGN PATENT DOCUMENTS

DE       102018218744       5/2019
EP         1550818          7/2005
(Continued)

OTHER PUBLICATIONS

International Preliminary Report on Patentability issued in PCT/EP2021/050876, dated Aug. 23, 2022, 6 pages.

*Primary Examiner* — David M Upchurch
(74) *Attorney, Agent, or Firm* — HAYES SOLOWAY P.C.

(57) ABSTRACT

The apparatus for fastening a vehicle component in and/or on a vehicle has a sound insulation element with a carrier layer and a sound absorbing layer. An anchoring recess is formed in the carrier layer and has an insertion opening in a first side of the carrier layer, which insertion opening is adjoined by a receiving space which is delimited by the plastic material of the carrier layer and is defined by a closed circumferential inner side and a closed bottom surface. An anchoring element is further provided. The anchoring recess has a constriction area formed on the circumferential inner side and at least partially narrowing the receiving space, with a widened widening area adjoining in the direction of the bottom surface. The anchoring element has an anchoring (Continued)

shoulder for engaging behind the constriction area when the anchoring element is received by the anchoring recess.

15 Claims, 4 Drawing Sheets

(51) Int. Cl.
 *F16B 5/06* (2006.01)
 *F16B 21/06* (2006.01)
 *F16B 21/08* (2006.01)
(52) U.S. Cl.
 CPC .......... *F16B 5/0657* (2013.01); *F16B 5/0664* (2013.01); *F16B 21/065* (2013.01); *F16B 21/084* (2013.01)

(56) References Cited

U.S. PATENT DOCUMENTS

2007/0261332 A1* 11/2007 Mohiuddin ......... B60R 13/0206
 52/236.9
2021/0086841 A1* 3/2021 Brichet ................. B62D 25/00

FOREIGN PATENT DOCUMENTS

| GB | 2005191 | 4/1979 |
| GB | 2568704 | 5/2019 |

* cited by examiner

APPARATUS FOR FASTENING A VEHICLE COMPONENT IN AND/OR ON A VEHICLE

BACKGROUND OF THE INVENTION

The invention relates to an apparatus for fastening a vehicle component in and/or on a vehicle.

Motor vehicles are equipped with sound insulation elements to dampen potential noise entering the interior of the vehicle. Such sound insulation elements are, for example, a front wall cladding or a floor cladding that is arranged or fitted in the vehicle body. Further examples of sound insulation elements are encapsulations for e.g. engines, compressors or similar vehicle components that generate noise.

Sometimes it is necessary to attach further vehicle components to such sound insulation elements, either permanently or temporarily. The latter may be necessary in particular during the assembly of a vehicle, for example when a vehicle component is pre-assembled on a sound insulation element in order to be able to be removed from the vehicle component when it is installed in order to place it at another location on the vehicle.

It is the object of the invention to provide an improved apparatus for fastening a vehicle component in and/or on a vehicle.

SUMMARY OF THE INVENTION

To solve this problem, the invention proposes an apparatus for fastening a vehicle component in and/or on a vehicle, which is provided with
- a sound insulation element such as a front wall cladding, a floor cladding, a luggage compartment cladding or an engine or power unit encapsulation or a wheel arch cladding,
- wherein the sound insulation element comprises a carrier layer comprising plastic material and having a first side and a second side facing away from the first side, and a sound absorbing layer formed on the second side of the carrier layer and likewise comprising a plastic material or synthetic fibre or natural fibre material,
- wherein an anchoring recess is formed in the carrier layer, the anchoring recess having an insertion opening in the first side of the carrier layer, the insertion opening being adjoined by a receiving space delimited by the plastic material of the carrier layer, the receiving space being defined by a closed circumferential inner side and a closed bottom surface, and
- an anchoring element to be received in the anchoring recess,
- wherein the anchoring element
  - is made in one piece with a component to be fixed to the sound insulation element or
  - is made in one piece with a holding element to which the component to be attached to the sound insulation element can be attached, or
  - can be guided through a through opening formed in the component to be attached to the sound insulation element,
- wherein the anchoring recess having a constriction area formed on the circumferential inner side and at least partially narrowing the receiving space, with a widened widening area adjoining in the direction of the bottom surface, and
- wherein the anchoring element has an anchoring shoulder for engaging behind the constriction area when the anchoring element is received by the anchoring recess.

The fastening device for vehicle components according to the invention serves to fasten such components to a sound insulation element, which in turn is usually attached to the vehicle body. In a known manner, the sound insulation element has a mass-spring system and—comprises a carrier layer, also referred to as a heavy or mass layer, made of a plastic material, on one side of which a sound-absorbing layer made of a sound-absorbing plastic material, such as PU foam, is formed. Alternatively, the sound-absorbing layer may comprise synthetic fibre or natural fibre material. An anchoring recess is formed in the carrier layer, which is shaped in the manner of a deep-drawn cup. The anchoring recess has an insertion opening in the first side of the carrier layer facing away from the sound-absorbing layer, which opening is adjoined by a receiving space delimited by the plastic material of the carrier layer, which receiving space is defined by a closed inner circumferential surface and a closed bottom surface. The peripheral and bottom walls of the recess are thus closed and consist of the plastic material of the carrier layer. In other words, the anchoring recess is designed in the manner of a bead.

In a preferred embodiment, the anchoring recess has a cylindrical profile at least in sections. In a further preferred embodiment, the anchoring recess has a depth which is between 4 mm and 50 mm, preferably between 7 mm and 40 mm and particularly preferably between 10 mm and 30 mm. In a further advantageous embodiment, the anchoring recess also has a diameter which is between 2 mm and 40 mm, preferably between 4 mm and 30 mm and particularly preferably between 6 mm and 20 mm.

The advantage of the proposed design of the anchoring recess according to the invention with a closed jacket or circumferential wall and bottom wall, i.e. as a blind hole, so to speak, in the carrier layer is of an acoustic nature, namely sound-absorbing; because as a result, the sound insulation element does not have any through-openings.

The fastening device according to the invention also includes an anchoring element to be—received in the anchoring recess (or which can be received in the anchoring recess). This anchoring element can be made in one piece with the vehicle component to be fastened to the sound insulation element. Alternatively, the anchoring element can also be made in one piece with a holding element, to which the component to be fastened can be attached. Finally, it is also possible that the component to be fastened has a through-opening through which the anchoring element can be guided, whereby the component is then fixed to the sound insulation element when the anchoring element is received by the anchoring recess.

Anchoring elements with several barb-like hooking structures are known, which surround a shaft of the anchoring element, for example in the form of flexible lamellae. Preferably, the anchoring element has barb-like structures on its outer circumference. These barb-like structures and/or projections may be deformable and/or elastically arranged on a base body of the anchoring element.

According to the invention, the anchoring recess has a constriction area which narrows the receiving space partially or on all sides and is preferably formed on the inner circumferential side near the insertion opening. Towards the bottom surface, the constriction area is joined by a widening area. In this way, an undercut is created within the receiving space which, when the anchoring element is received by the anchoring recess, is gripped behind by an anchoring shoulder formed on the anchoring recess.

Due to the interaction of the anchoring shoulder of the anchoring element with the transition from the constriction to the widening area of the anchoring recess, the anchoring element is now reliably secured against unintentional detachment from the anchoring recess. The constriction area extends on all sides or partially longitudinal the inner circumferential side. The constriction area is formed, for example, as a continuous or interrupted inner bead which projects inwards from the inner circumferential side of the receiving space of the anchoring recess.

Alternatively, the inner circumferential side of the receiving space can also have a recess, which then forms the widening area, wherein the constriction area is preferably located between the insertion opening and this recess. The widening area may also extend to the bottom surface, but this is not absolutely necessary.

Depending on which vehicle component is to be fastened with the apparatus according to the invention, it may be advantageous to provide a mounting aid which can then also assume a further function in the installed state. In a preferred embodiment of the invention in this respect, a positioning aid is provided alternatively or cumulatively, so to speak, that a positioning recess is formed in the carrier layer of the sound insulation element, which positioning recess has an insertion opening in the first side of the carrier layer, which insertion opening is adjoined by a receiving space delimited by the plastic material of the carrier layer, which receiving space is defined by a closed circumferential inner side and a closed bottom surface, that a positioning element is provided which is made in one piece with the component to be fastened to the sound insulation element or in one piece with a holding element to which the component to be fastened to the sound insulation element can be attached, and/or that the positioning element and the anchoring element are insertable and/or insertable into their respective associated recesses when aligned with the positioning recess and the anchoring recess, respectively.

In addition to the anchoring element, the apparatus according to the invention also has a positioning element with which a positioning recess is associated on the part of the sound insulation element. This positioning recess is again formed in the carrier layer of the sound insulation element, preferably in the same way as the receiving recess as a bead or deep-drawn cup, as it were. The positioning recess does not require any special design on the inner circumferential side of its receiving space. Accordingly, the positioning recess is also designed as a closed structure on its lateral surface and its bottom surface. The insertion opening is again located in the side of the carrier layer opposite the sound-absorbing layer. Thus, the positioning recess is also designed as a blind hole, which is acoustically advantageous, as already described above in connection with the anchoring recess.

Preferably, the anchoring recess and the positioning recess have similar depths, in particular depths that do not differ by more than 20%, preferably by no more than 10%. In a further preferred embodiment, the positioning recess has a smaller cross-section than the anchoring recess.

In a preferred embodiment, the anchoring recess has a depth that is selected such that the anchoring element does not reach the bottom of the anchoring recess in an assembled state. For example, it is possible for the anchoring recess to be slightly deeper, preferably between 1 mm and 5 mm, preferably between 1 mm and 3 mm and preferably about 2 mm deeper than the anchoring element extends. This allows the worker to preload the clip and barbs a little. When the assembly force decreases, the clip springs back slightly and then sits securely. In this way, engagement can be ensured.

In a further preferred embodiment, the positioning element has at least one and preferably several grooves extending in the longitudinal direction of the positioning element on its outer circumference.

The positioning recess ensures an assembly, that the vehicle component to be attached is—fastened in the prescribed orientation. To prevent incorrect positioning of the component to be attached, at least one of the two recesses (i.e. either the positioning recess or the anchoring recess) can be mechanically coded so that the positioning element can be inserted exclusively into the positioning recess and/or the anchoring element can be inserted exclusively into the anchoring recess. The interaction of the positioning element and the positioning recess ensures, in addition to the assembly aid and the support of the correct alignment of the vehicle component during assembly, that the component is secured against twisting in the assembled state.

In an advantageous embodiment of the invention, the mechanical coding or the different mechanical coding can be realised, for example, by the anchoring element and the anchoring recess having a mutually identical cylindrical first cross-section, by the positioning element and the positioning recess having a mutually identical cylindrical second cross-section, and by the size of the first cross-section being different from the size of the second cross-section. Alternatively, the mechanical coding can also be realised in that the anchoring element and the anchoring recess have a mutually equal first cross-sectional area, in that the positioning element and the positioning recess have a mutually equal second cross-sectional area, and in that the second cross-sectional area is different from the first cross-sectional area or in that the second cross-sectional area is equal to the first cross-sectional area and is oriented in a twisted manner with respect to the second cross-sectional area.

In a further advantageous embodiment of the invention, it may be provided that the insertion opening of the anchoring recess has an opening edge and that the anchoring element has a circumferential flange with a circumferential edge region which projects beyond the edge of the insertion opening of the locking recess and thus covers the insertion opening of the locking recess in the state of the locking element received thereby.

In a similar embodiment, in another advantageous embodiment of the invention, it may be—provided that the insertion opening of the positioning recess has an opening edge and that the positioning element has a circumferential flange with a circumferential edge region which projects beyond the edge of the insertion opening of the positioning recess and thus covers—the insertion opening of the positioning recess in the state of the positioning element received thereby.

The fastening device according to the invention cannot only be formed on sound insulation elements of the type mentioned above. Alternatively, it is envisaged that the sound insulation layer consists exclusively of the carrier layer as a so-called mass layer, i.e. does not have a sound absorbing layer. Furthermore, it is also possible that the carrier layer of a sound insulation element which can be used for the invention comprises both a sound absorbing layer and, for example, a carpet; in this embodiment, the carrier layer is thus located between the other two layers mentioned above. Depending on the application, either the sound attenuation layer or the carrier layer may be in contact with the body of the vehicle.

In a further embodiment, the holding element is substantially flat, in particular on the surface facing the recesses.

In a further advantageous embodiment, the holding element can be positioned in a trough formed in the carrier layer. This trough can, for example, have a substantially rectangular profile, in particular a rectangular profile with rounded corners. In a further preferred embodiment, the trough has a depth that is less than a depth of the anchoring recess. In a further preferred embodiment, the holding element is positionable in the trough such that the holding element is spaced from a bottom of said trough. However, it would also be possible for a bottom of the trough and the holding element to be adjacent to each other at least in sections.

The present invention is further directed to a motor vehicle and in particular a road motor vehicle having an apparatus of the type described above.

BRIEF DESCRIPTION OF THE DRAWINGS

The invention is explained in more detail below by means of several embodiments and with reference to the drawings. In detail, the following are shown.

DETAILED DESCRIPTION OF THE INVENTION

Figure 1:
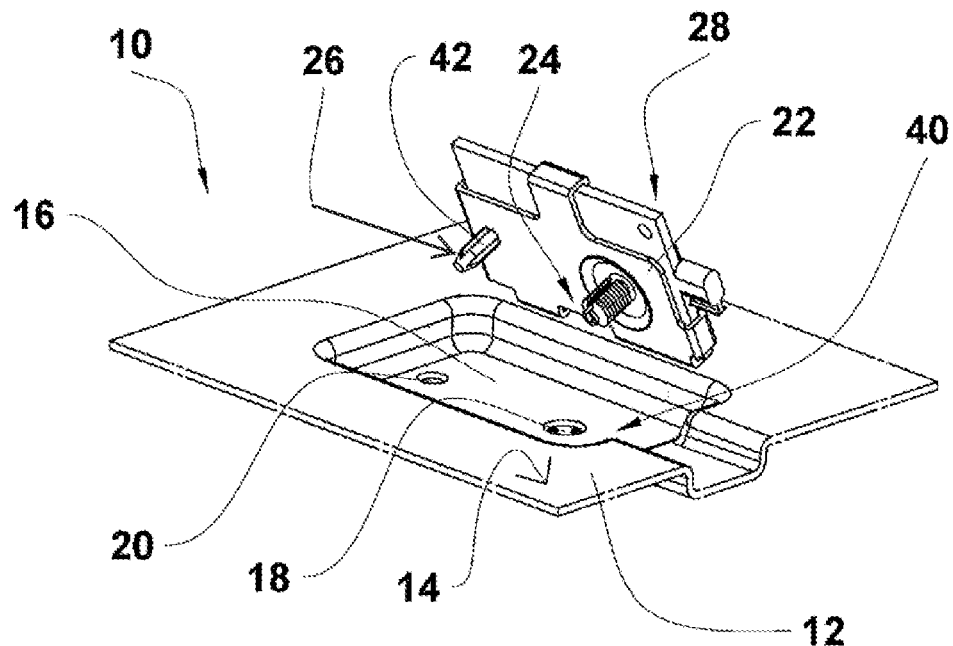
FIG. 1 a top view of the carrier layer of a sound insulation element with the component holding element shown in perspective, which in this case can be positioned in a recess within the carrier layer of the sound insulation element, FIG. 2 a perspective view of the underside of the holding element with an anchoring element and a positioning element, FIG. 3 a sectional view through the arrangement of sound insulation element and holding element attached to it for a vehicle component, FIG. 4 a variant of the fastening device according to the invention in which an expansion dowel concept is used as an anchoring element, FIG. 5 a further variant of the fastening device according to the invention with a narrowed region extending into the plane of the insertion opening of the anchoring recess, and FIG. 6 a further variant of the fastening device according to the invention, in which the anchoring element is directly connected in one piece to the component to be fastened.

In FIG. 1, a top view of a sound insulation element 10 is shown, which has a carrier layer 12 made of plastic material. The plastic material of the carrier layer 12 can, for example, have a Shore A hardness in the range from 66 to 90 and in particular in the range from 70 to 85. A—suitable plastic material for the carrier layer 12 is, for example, EVA/PE, PE, PP, EPDM, TPE or TPO.

With reference to the illustration in FIG. 1, a sound-absorbing layer 13 made of a preferably foamed sound-absorbing material, which may be a PU foam, for example, is located behind the carrier layer 12. This sound-absorbing layer is therefore located on the side of the carrier layer 12 facing away from the first side 14 of the carrier layer 12 shown in FIG. 1.

Figure 3:
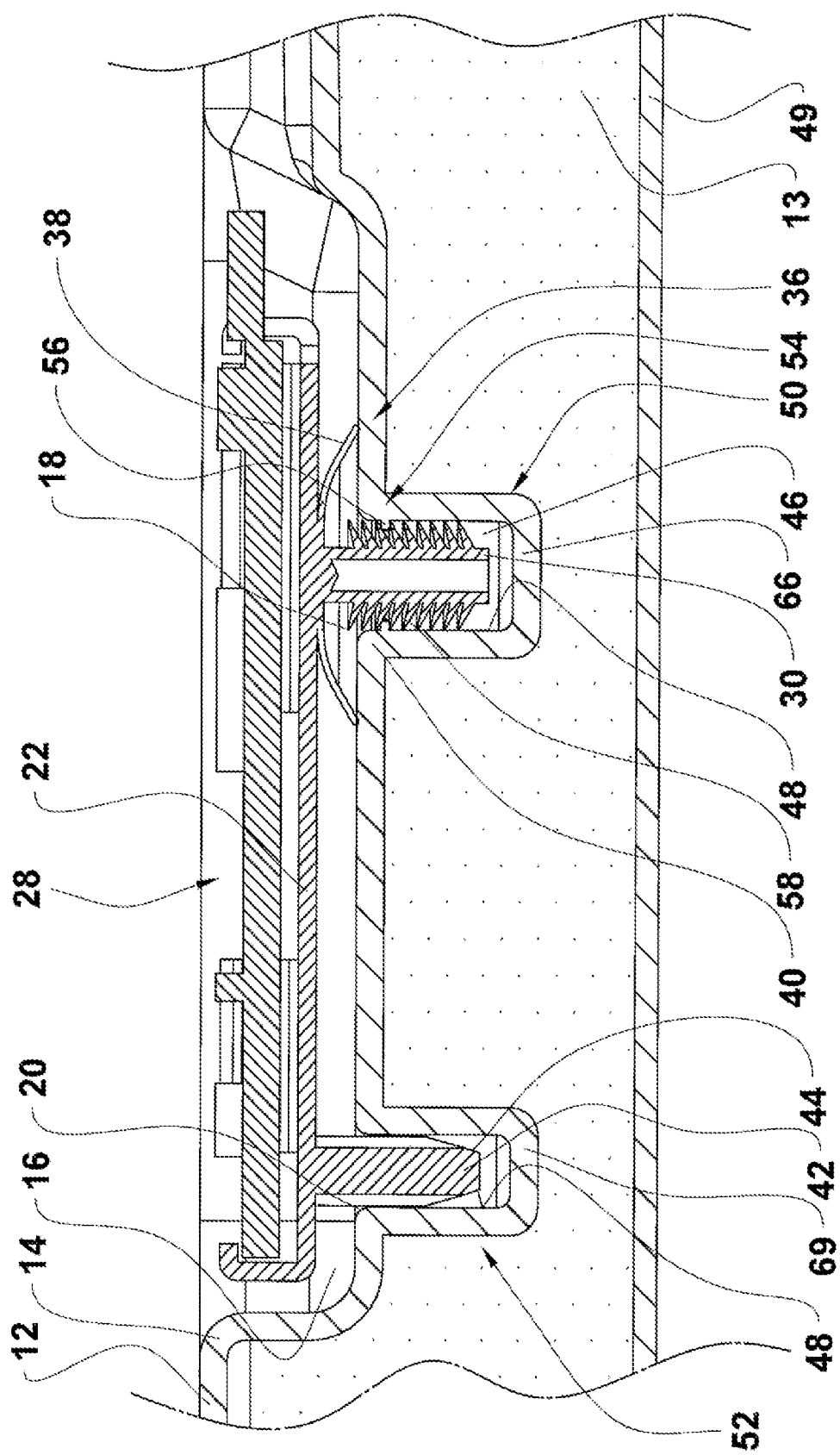

In a trough 16 of the carrier layer 12, as can be seen in FIG. 1, there are two insertion openings 18, 20, one of which insertion opening 18 belongs to an anchoring recess 50 (see FIG. 3), while the other insertion opening 20 allows access to a positioning recess 52 (see also FIG. 3).

In a corresponding manner, a holding element 22 which can be accommodated in the trough 16 is formed with a protruding anchoring element 24 and a likewise protruding positioning element 26. A vehicle component 28, which may be a smaller component unit, is located on the holding element 22.

Figure 2:
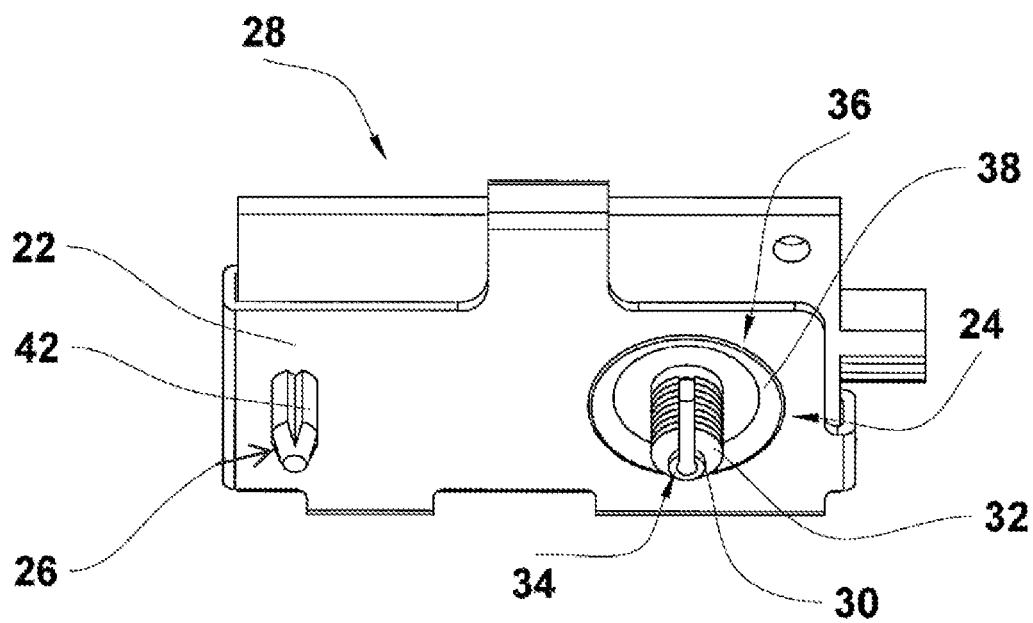

The design of the anchoring element 24 and the positioning element 26 can be seen more clearly in FIG. 2. In this embodiment, the anchoring element 24 has a hollow, slotted shaft 30, from which anchoring projections or lamellae 32, aligned as barbs, project circumferentially. At its other end of the shaft 30, facing away from the free end 34, there is a preferably flexible circumferential flange 36, which covers the opening edge 40 of the insertion opening 18 with its circumferential edge region 38.

The positioning element 26 is also pin-shaped and has a shaft 42 having, for example, a cross-sectional structure.

The insertion openings 18, 20 are differently designed or dimensioned with regard to their cross-sectional areas, so that the retaining element 22 can be fastened and mounted to the sound insulation element 10 exclusively in the orientation shown in FIG. 1.

FIG. 3 shows a cross-section of the fastening situation. The sound insulation element 10 has the heavy or carrier layer 12, in the first side 14 of which the insertion openings 18, 20 are formed. Both insertion openings 18, 20 are adjoined on all sides, i.e. on both the circumferential side and the bottom side by closed receiving spaces 44, 46, the circumferential inner sides 48 of which are formed by the material of the carrier layer 12. The anchoring recess 50 and the positioning recess 52, which adjoin the respective insertion opening 18 or 20, are formed like cups or caps in the carrier layer 12. The sound insulation element 10 rests against the vehicle body 49, as indicated in FIG. 3.

As can be seen from FIG. 3, the receiving space 46 of the anchoring recess 50 has a narrowing region 54 which is formed on all sides or partially and circumferentially on the inner circumferential side 48 of the receiving space 46. In this embodiment example, the constriction area 54 is formed as a bead 56 projecting inwardly into the receiving space 46. Such a structure of a receiving space 46 with, as it were, an undercut can be produced by injection moulding by forced demoulding or by injection moulds provided with a folding core. A widening area 68 adjoins the constriction area 54 towards the bottom surface 66 of the receiving space 46.

The positioning recess 52 is also closed on its bottom surface 69 and on its circumferential side. Both recesses, i.e. the anchoring recess 50 and the positioning recess 52, are thus designed as blind holes.

An anchoring shoulder 58, formed on the shaft 30 of the anchoring element 24 and projecting radially therefrom and facing (in the installed state) the insertion opening 18, is used for the cooperation of the anchoring element 24 with the anchoring recess 50. This anchoring shoulder 58 can be formed as the lamella closest to the circumferential flange 36. However, this is not absolutely necessary.

Figure 4:
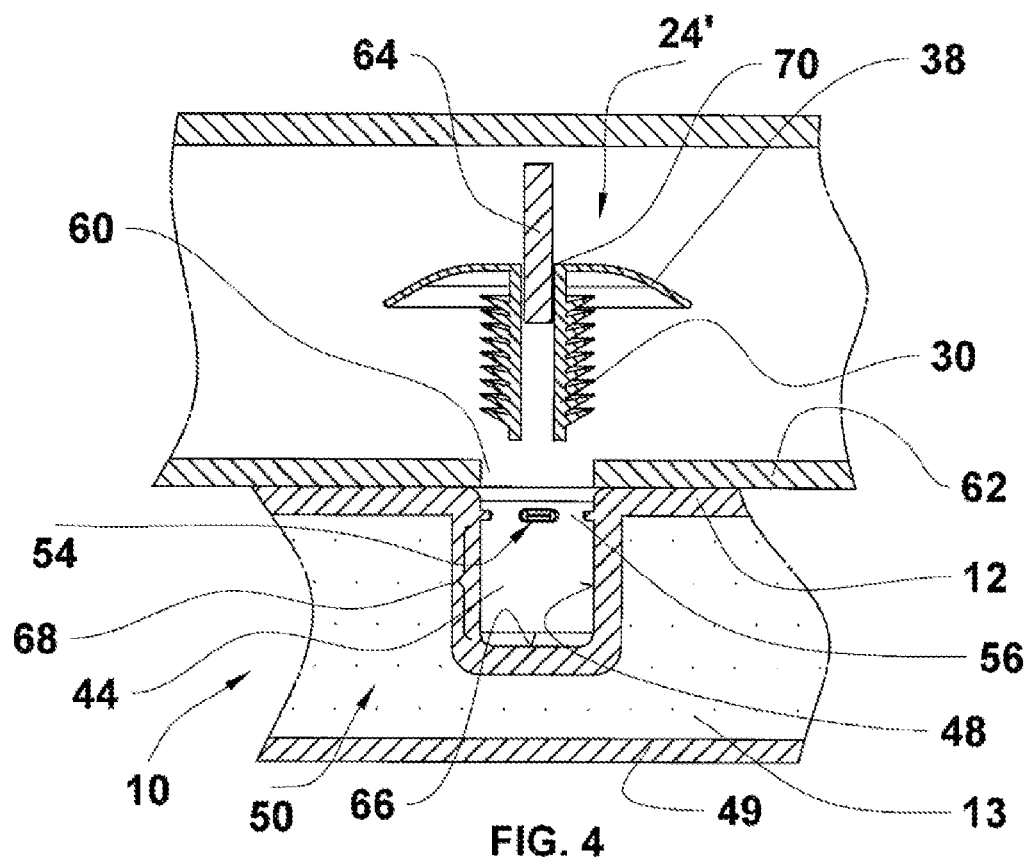

FIG. 4 shows an alternative design of the fastening device according to the invention. If the elements of the fastening device shown in FIG. 4 are functionally or constructively compatible with those shown in FIG. 3, they are given the same reference signs in FIG. 4 as in FIG. 3.

In the embodiment example of the fastening device of FIG. 4, there is only one anchoring element 24' without an associated positioning element 26. Several such individual anchoring elements 24' can be used. The component to be fastened to the sound insulation element 10 is, for example, a cable duct or ventilation duct. This has a through-opening 60 in its duct wall 62, through which the anchoring element 24' can be guided and inserted into the anchoring recess 50 in the sound insulation element 10, which is aligned with the through-opening 60. In this embodiment example, the anchoring element 24' can basically be constructed in the same way as the anchoring element 24 of the fastening device according to FIGS. 1 to 3. The difference is that the anchoring element 24' is not formed integrally with a further element (in FIGS. 1 to 3 this is the holding element 22).

In addition, FIG. 4 shows the variant that the anchoring element 24' is designed as an expansion dowel. A core pin 64 can be seen, which can be inserted into the shaft 30 through the circumferential flange 28 (widened head of the anchoring element 24), which has a through opening 70.

Figure 5:
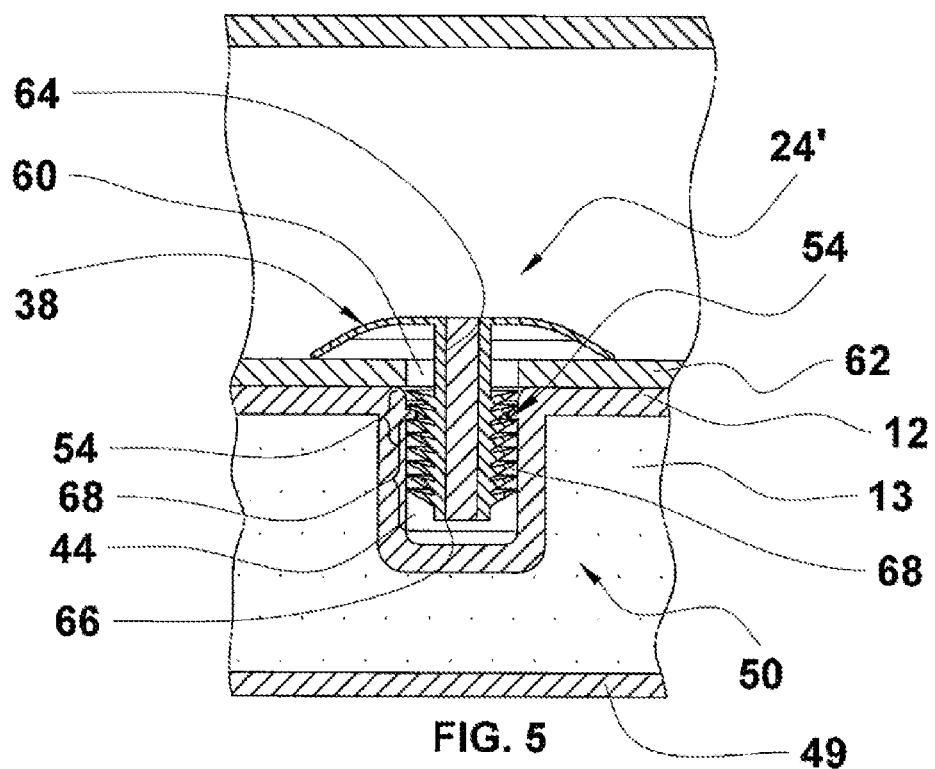

In FIG. 5, a variant of the design according to the fastening device in FIG. 4 is shown in that the constriction area 54 is extended with regard to its axial depth extension. As in FIGS. 1 to 4, a widening area 68 adjoins the constriction area 54 towards the bottom surface 66 of the anchoring recess 50 (see in particular FIGS. 3 and 4).

Figure 6:
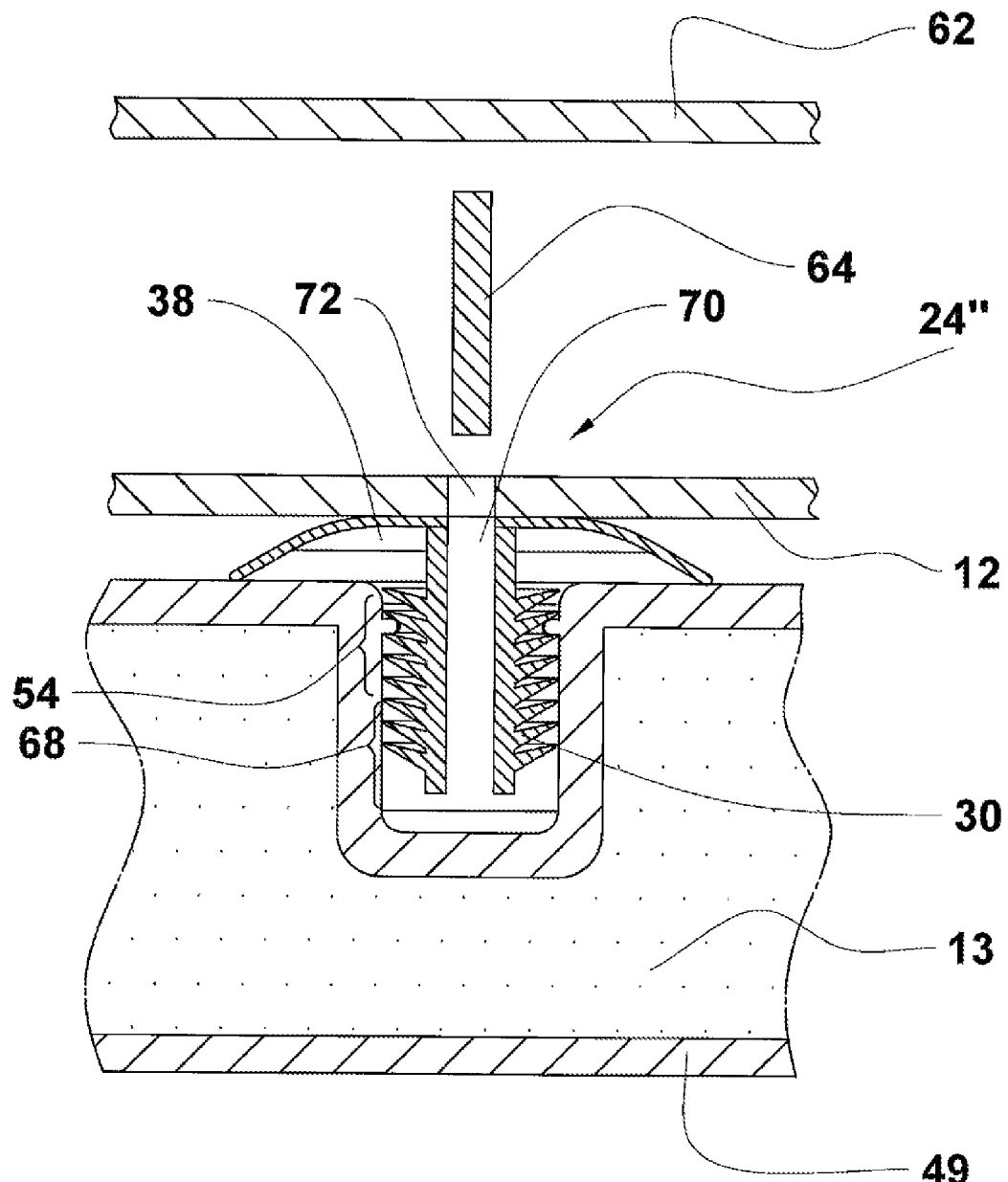

FIG. 6 shows a further embodiment of the fastening device, in which the anchoring element 24" is again designed as an expansion anchor (as in FIGS. 4 and 5), but is made in one piece with the vehicle component to be fastened (similar to that shown in FIGS. 1 to 3). A through opening 70 extends through the circumferential flange 38 of the anchoring member 24", which is aligned with the cavity in the shaft 30 of the anchoring member 24". The component to be fixed also has a through opening 72 which is aligned with the through opening 70.

REFERENCE LIST

10 sound insulation element
13 sound absorbing layer
12 carrier layer
14 a side of the carrier layer
16 trough
18 insertion opening of the anchoring recess
20 insertion opening of the positioning recess
22 holding element
24 anchoring element
24' anchoring element
24" anchoring element
26 positioning element
28 vehicle component
30 shaft of the anchoring element
32 lamellae
34 end of the shaft
36 circumferential flange
38 circumferential edge area of the circumferential flange
40 opening edge
42 shaft of the positioning element
44 receiving space of the anchoring element
46 receiving space of the positioning element
48 circumferential inner side
49 vehicle body
50 anchor recess
52 positioning recess
54 constriction area of the anchoring recess
56 bead
58 anchoring shoulder
60 through opening in duct wall
62 duct wall
64 core pin
66 bottom surface of the anchoring recess
68 widening area of the anchoring recess
69 bottom surface of the positioning recess
70 through opening in the anchoring element
72 through opening in the vehicle component

The invention claimed is:

1. An apparatus for fastening a vehicle component in and/or on a vehicle, having a sound insulation element wherein the sound insulation element comprises a carrier layer, which has a plastic material, with a first side and a second side remote therefrom and a sound absorbing layer, which is formed on the second side of the carrier layer, of likewise a plastic material or of synthetic fibre or natural fibre material, wherein an anchoring recess is formed in the carrier layer, which anchoring recess has an insertion opening in the first side of the carrier layer, which insertion opening is adjoined by a receiving space delimited by the plastic material of the carrier layer, which receiving space is defined by a closed circumferential inner side and a closed bottom surface, and an anchoring element for receiving in the anchoring recess, wherein the anchoring element is formed in one piece with a component to be fastened to the carrier layer of the sound insulation element or is formed in one piece with a holding element to which the component to be fastened to the carrier layer of the sound insulation element can be attached, or can be guided through a through-opening formed in the component to be fastened to the carrier layer of the sound insulation element, wherein the anchoring recess has a receiving space formed on the circumferential inner side, which at least partially narrows the receiving space and has a widened widening area adjoining it in the direction of the bottom surface and/or wherein the anchoring element has an anchoring shoulder for engaging behind the constriction area when the anchoring element is received by the anchoring recess, wherein a positioning element is provided, which is constructed in one piece with the component to be fastened to the carrier layer of the sound insulation element or in one piece with a holding element, to which the component to be fastened to the carrier layer of the sound insulation element can be attached.

2. The apparatus according to claim 1, wherein a positioning recess is formed in the carrier layer of the sound insulation element, which positioning recess has an insertion opening in the first side of the carrier layer, which insertion opening is adjoined by a receiving space which is delimited by the plastic material of the carrier layer and is defined by a closed circumferential inner side and a closed bottom surface.

3. The apparatus according to claim 1, wherein the positioning element and the anchoring element are insertable and/or insertable into their respective recesses when aligned with the positioning recess and the anchoring recess, respectively.

4. The apparatus according to claim 3, wherein the pairs of anchoring element and anchoring recess and positioning element and positioning recess are mechanically coded differently for preventing misalignment of the component to be fastened to the carrier layer of the sound insulation element in its fastening state.

5. The apparatus according to claim 3, wherein the anchoring element and the anchoring recess have a mutually equal cylindrical first cross-section, that the positioning element and the positioning recess have a mutually equal cylindrical second cross-section, and that the size of the first cross-section is different from the size of the second cross-section.

6. The apparatus according to claim 3, wherein the anchoring member and the anchoring recess have a mutually equal first cross-sectional area, that the positioning member and the positioning recess have a mutually equal second cross-sectional area, and that the second cross-sectional area is different from the first cross-sectional area or that the second cross-sectional area is equal to the first cross-sectional area and is oriented in a twisted manner with respect to the second cross-sectional area.

7. The apparatus according to claim 1, wherein the insertion opening of the anchoring recess has an opening edge and in that the anchoring element has a circumferential flange with a circumferential edge region which projects beyond the edge of the insertion opening of the locking recess and thus covers the insertion opening of the locking recess in the state of the locking element received by the latter.

8. The apparatus according to claim 2, wherein the insertion opening of the positioning recess has an opening edge and in that the positioning element has a circumferential flange with a circumferential edge portion which projects beyond the edge of the insertion opening of the positioning recess and thus covers the insertion opening of the positioning recess in the state of the positioning element received thereby.

9. The apparatus according to claim 1,
wherein
the anchoring element has barb-like structures on its outer circumference.

10. The apparatus according to claim 1, wherein the holding element is substantially flat.

11. The apparatus according to claim 1,
wherein
the holding element can be positioned in a trough formed in the carrier layer.

12. The apparatus according to claim 11, wherein
the holding element is positionable in the trough such that the holding element is spaced from a bottom of said trough.

13. The apparatus according to claim 12, wherein
the anchoring recess has a depth which is chosen such that the anchoring element does not reach the bottom of the anchoring recess in an assembled state.

14. A motor vehicle with an apparatus according to claim 1.

15. The apparatus according to claim 1, wherein the vehicle component is selected from a group consisting of a front wall cladding, a floor cladding, a luggage compartment cladding, an engine or aggregate encapsulation and a wheel housing cladding.

* * * * *